United States Patent
Egan et al.

(10) Patent No.: US 7,298,464 B1
(45) Date of Patent: Nov. 20, 2007

(54) SYSTEM AND METHOD FOR MEASURING THE PHASE NOISE OF VERY LONG FIBER OPTIC LINKS

(75) Inventors: Jonathan D. Egan, Elkridge, MD (US); Anastasios P. Goutzoulis, Annapolis, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 205 days.

(21) Appl. No.: 11/115,389

(22) Filed: Apr. 27, 2005

(51) Int. Cl.
*G01N 21/00* (2006.01)

(52) U.S. Cl. .................................................... 356/73.1
(58) Field of Classification Search ............... None
See application file for complete search history.

(56) References Cited

U.S. PATENT DOCUMENTS

2002/0044273 A1* 4/2002 Kimura et al. ............. 356/73.1

FOREIGN PATENT DOCUMENTS

WO      WO 2004/109527 A1 * 12/2004

* cited by examiner

*Primary Examiner*—Tu T. Nguyen
(74) *Attorney, Agent, or Firm*—Rothwell, Figg, Ernst & Manbeck

(57) ABSTRACT

A method for determining the phase noise of a fiber optic cable includes a step of transmitting a reference signal and a test signal over the fiber optic cable to be tested. The reference and test signal are provided with different wavelengths. The phase noise of the fiber optic cable is calculated by comparing the reference signal and the test signal output from the fiber optic cable.

16 Claims, 5 Drawing Sheets

SYSTEM AND METHOD FOR MEASURING THE PHASE NOISE OF VERY LONG FIBER OPTIC LINKS

BACKGROUND OF THE INVENTION

1. Field of the Invention

The present invention relates generally to methods for testing phase noise in long fiber length at high RF frequencies.

2. Description of the Related Art

Fiber optic communication is well known. Fiber optic (FO) links are used in a number of current technologies, including for transmitting remote radio frequency (RF) signals in various systems, such as X-band phased array radars systems.

For accurate phase noise measurements, a reference path is needed in order to subtract the system phase noise thereby increasing the overall measurement dynamic range of the link. The reference path must have a length virtually identical to that of the device under test (DUT) length. For long length FO links (i.e., 1-10 km), this task is almost impossible to achieve. Additionally, if two different long fibers were used, an additional uncertainty is created because the dispersion characteristics of the two fibers may not be the same.

Thus, there is a need for new and improved systems and methods for testing phase noise in long fiber length at high RF frequencies.

SUMMARY OF THE INVENTION

This invention includes novel systems and methods for measuring the phase noise of very long fiber optic (FO) links. According to an embodiment of the present invention, a method for determining the phase noise of a fiber optic cable includes a step of transmitting a reference signal and a test signal over the fiber optic cable to be tested. The reference and test signal are provided with different wavelengths. The phase noise of the fiber optic cable is calculated based on a comparison of the reference signal and the test signal output from the fiber optic cable.

The reference signal and test signal can be generated from a single RF signal, which can be split and separately modulated. The calculation step can be performed with a commercially available test set.

The wavelengths of the test signal and reference signal should be selected based on the properties of light in the long FO links. Preferably, the wavelength of the test signal and reference signal are approximately 1550 nanometers (nm) and 1310 nm, respectively.

For extremely long FO links, the reference signal should be set to a longer wavelength. The reference and the test signal wavelengths should be separated by at least one nanometer.

According to another embodiment of the present invention, a system for measuring the phase noise of a fiber optic link includes a signal generator, a splitter, first and second optical modulators, a demultiplexer, and a phase noise calculation unit. The signal generator generates a radio frequency (RF) signal, which is split by the splitter, and modulated by the first and second modulators to provide a test signal and a reference signal. Both signals are input into the fiber optic link to be tested. Therefore, the signal may be combined or multiplexed before inputting into the FO link. The signal output from the FO link is separated or demultiplexed into separate reference and test signals. These signals can be converted to electrical signals (e.g., RF, IF, etc.) and input into the phase noise calculation unit. The phase noise calculation unit calculates the phase noise based on a comparison of the two signals.

Further applications and advantages of various embodiments of the present invention are discussed below with reference to the drawing figures.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 1:
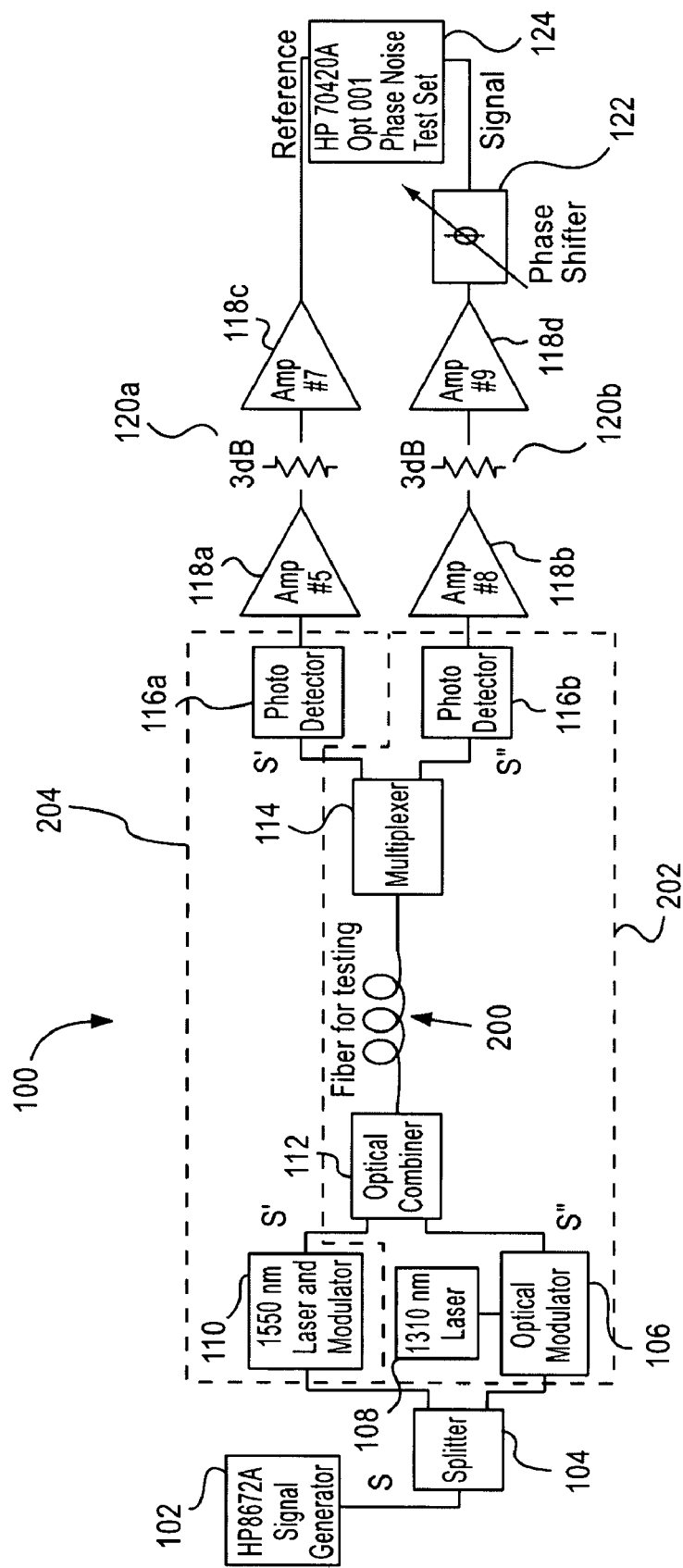
FIG. 1 is a block a system for measuring phase noise according to an embodiment of the present invention.

According to an embodiment of the present invention, optical Wavelength Division Multiplexing (WDM) is utilized in the system and method for measuring phase noise in long FO links. Referring to FIG. 1, a system 100 is illustrated for determining the phase noise of a FO link 202 with a very long fiber cable 200 using a second FO link 204 as the reference link, sharing the same cable 200. The system may include a signal generator 102, a splitter 104, optical modulation devices—components 106, 108, and 110—, an optical combiner 112, an amplification circuit (118a-d, 120a-b), a phase shifter 122 and a test set 124.

The signal generator 102 is employed to generate a signal S, preferably RF, to be used to measure the phase noise of the FO link 202. The signal S is split by an RF splitter 104 into two signals, each of which are modulated at a separate wavelength. The method of modulation can be direct modulation of a laser or through an optical modulator as in 106 and 108 and 110. Two signals S' and S" are output, either of which can be considered as the DUT path or the reference path.

The two signals S' and S" are combined by an optical combiner 112 (or multiplexes) and input into the fiber 200 to be tested. The optical combiner 112 could be a grating or a pair of dichromatic optical filters or other well known combiner.

The two optical signals S' and S" multiplexed into a single combined signal propagate over the desired length of fiber 200, and are then separated or de-multiplexed by multiplexer 114. The signals S' and S" are converted to first and second electrical signals respectively by photo detectors, 116a, b. Each electrical signal can be amplified by an amplification circuit, if necessary. The amplification circuit may include amplifiers (118a-d) and attenuators (120a-b) to prevent any mismatch that might occur between amplifiers.

The first of the amplified signals is shifted out of phase from the other, preferably by 90 degrees, by the phase shifter 122. The shifted signal and the second non-shifted signal are input to a test unit (phase noise calculation unit) 124 for analysis. The test set 124 is configured to calculate and output the phase noise of the FO link 202 compared to FO Link 204.

Since the signals S' and S" are propagating over the same fiber length 200, their "coarse" paths are identical. However, their "fine" paths differ by an amount related to the minute difference in speed that the signals S' and S" encounter as a result of the slightly different index of refraction of the fiber with respect to the two different wavelengths thereof. This "fine" difference is predictable.

For example, for typical single mode SMF-28 fiber optic cable, the index of the refraction (n) is 1.4677 and 1.4682 for $\lambda$=1.31 µm and $\lambda$=1.55 µm, respectively. The total signal delay over a length of 10 km FO cable is 48.02333 µs and 48.94000 µs for $\lambda$=1.31 µm and $\lambda$=1.55 µm, respectively. Thus, the time delay difference between these two signals would be about 16.7 ns (corresponding to about 3.4 m of fiber). Extra fiber or coax cable can be used on the side of the 1.31 µm link to compensate for the delay, although not believed to be necessary. This fiber could be added before or after the fiber 200, between the signal splitter and the combiner, or between the demux and the O/E converters.

Exemplary phase noise measurements were performed using the basic setup of FIG. 1. Different fiber lengths were measured at an RF frequency of 10 GHz. An Agilent 5500 phase noise test set 124 was used with the +/− peak calibration method eliminating the need for a second signal generator. The signal source providing a 10 GHz signal for all the testing was an Agilent 8672A signal generator (102). A Miteq MPN6-06001800-23P amplifier (not shown) increased the output of the signal generator 102 before modulation. This amplifier was chosen for its high gain and output power.

The two signal outputs should be amplified to supply the phase noise calculation unit with an appropriate amount of power (between 0-10 dBm for the signal port and 7-10 dBm for the referenced port) in order to be able to properly process the signals. In this example, two stages of amplification were needed in order to get the gain required. For the reference path, amplifiers Avantek AFT-12663 (118a) and Miteq AFS4-00101000-50-8P-4 (118c) were used in series with a 3 dB attenuator (120a) between. The attenuator (120a) adds isolation between the amps to provide a good match and reduce spurs and reflections. For the signal path, two Miteq AFS4-00101000-50-8P-4 amplifiers (118b, d) were used, also with a 3 dB attenuator (120b) between. The phase noise of these four amplifiers was within about 5 to 7 dB of each other. Note that whatever noise exists before the splitter 104 is cancelled out because it is common to both paths.

Figure 2:
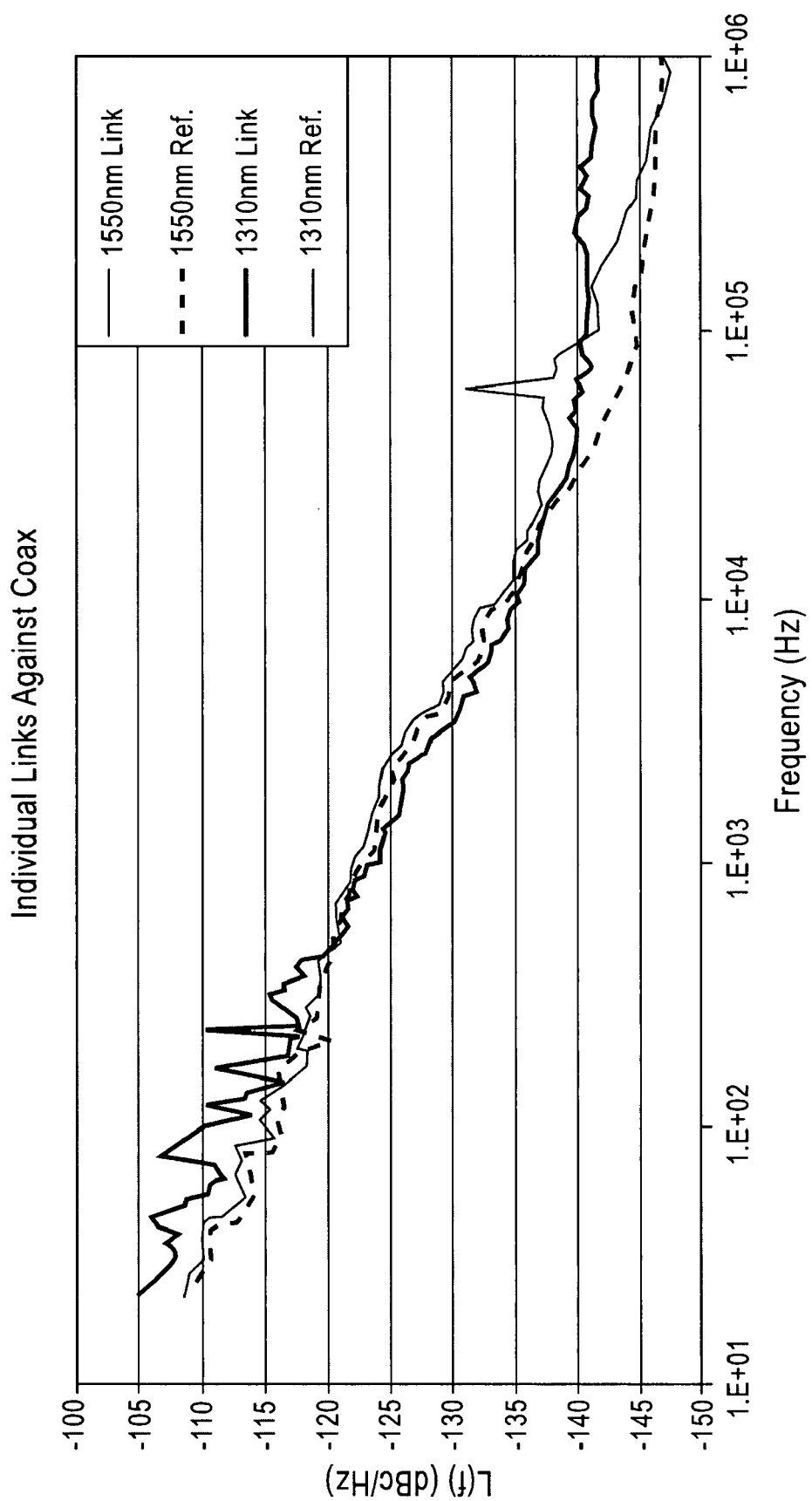
FIG. 2 is a graph of individualized links using a length of equalized coaxial cable reference.

Each FO link (including the multiplexers) should be measured (via short fibers) in order to establish a reference noise floor. The two FO links 202 and 204 should be equalized in delay with the combiner connected directly to the multiplexer, and then each link must be equalizer with a length of coax cable. The links are then tested individually against a coax, as shown in FIG. 2. (Note that in FIG. 2, the reference signal is the link replaced with attenuation equal to the loss of the link, but the length of coax was reduced to be equal to the attenuated path.) By comparing each link to its associated reference, the links are within 4 dB of each other at most frequencies.

Figure 3:
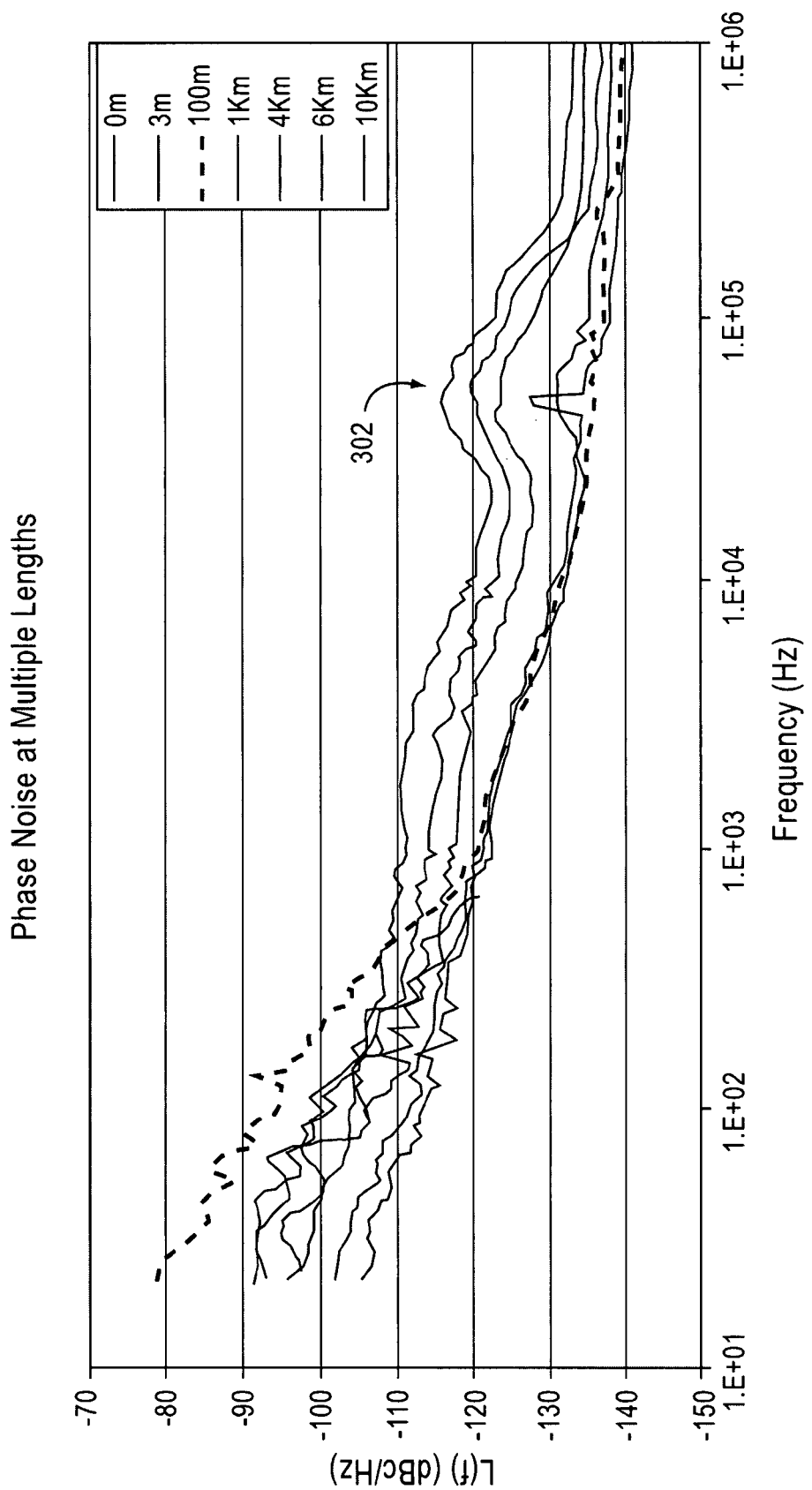
FIG. 3 is a graph of phase noise of fiber links at multiple lengths.

The long fiber tests can be performed once all the setup and reference testing is complete. Testing in the example was performed on various lengths of fiber. The lengths were 0 m, 3 m, 100 m, 1 km, 4 km, 6 km, and 10 km. The data for each length of fiber tested is shown in FIG. 3. From this data, a trend becomes clearly visible. For lengths above 1 km, the phase noise increases by nearly the same amount at all frequencies. This is expected because dispersion increases with length, which would increase phase noise. The exception to this trend is the "hump" 302 around 80 kHz. This "hump" 302 increases by an amount greater than the noise at the other frequencies. At 1 km the hump 302 is first noticeable. For lengths less than 1 km, the noise is about the same value. There is an exception, however, for 3 m and 100 m at frequencies less than 1 kHz. The 3 m fiber is not too extreme, but the 100 m has a noise about 22 dB greater than the 1 km fiber. It is thought that this anomaly was probably due to a bad or loose connection in the system. When an SMA connector is loose or bad, this very linear decrease from higher amplitude than expected as frequency increases is usually the result. The same would be the case for a fiber optic connection. So those two anomalies can be ignored, because they are not related to the length of the fiber or the links themselves.

Figure 4:
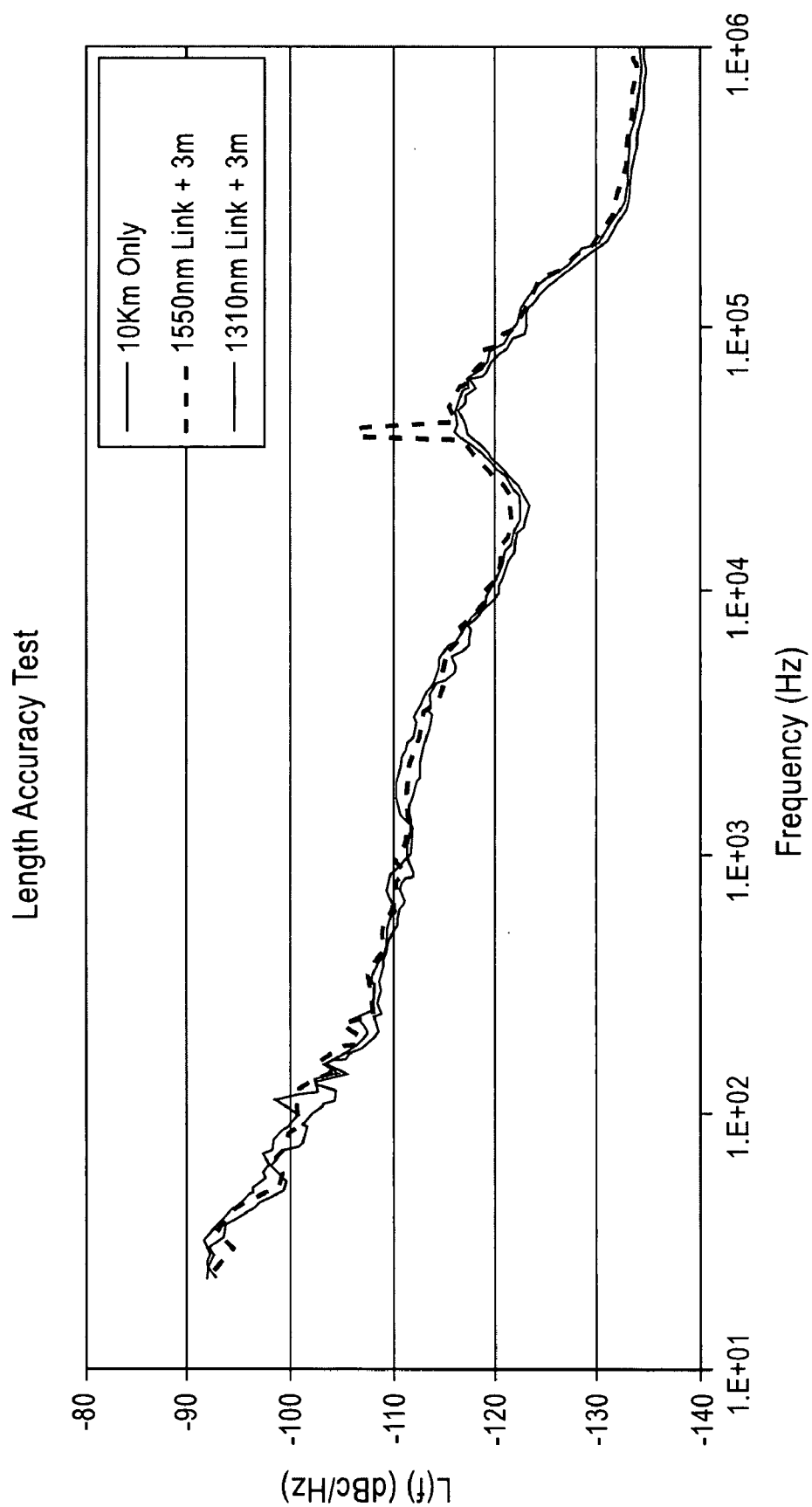
FIG. 4 is a graph showing the effect of adding fiber to links.

In an effort to reduce the high frequency phase noise, two different actions can be taken: (1) use of an optical isolator in front of each laser (to prevent reflections from getting into the laser which would increase the laser phase noise), and (2) find equalization of the relative paths (to improve common system noise cancellation). The use of an isolator in the exemplary system resulted in no major improvement in the measured phase noise. To test the fine equalization, a 3 m (~9 ft) length of fiber was added onto one of the links (when testing the 10 km fiber) and the measurement was repeated for the other link. FIG. 4 shows that there is little distinction between any of the three setups. So when dealing with a long length, such as 10 km, the equalization does not need to compensated for different wavelengths.

As a result of the claimed configuration, the need for two long fibers to test phase noise is eliminated and the uncertainty of differential dispersion is avoided. At lengths of 1 km, the phase noise increases equally at most frequencies. Differential delay resulting from the difference speed faced by the two wavelengths going through a 10 km fiber does not have any practical significance.

Figure 5:
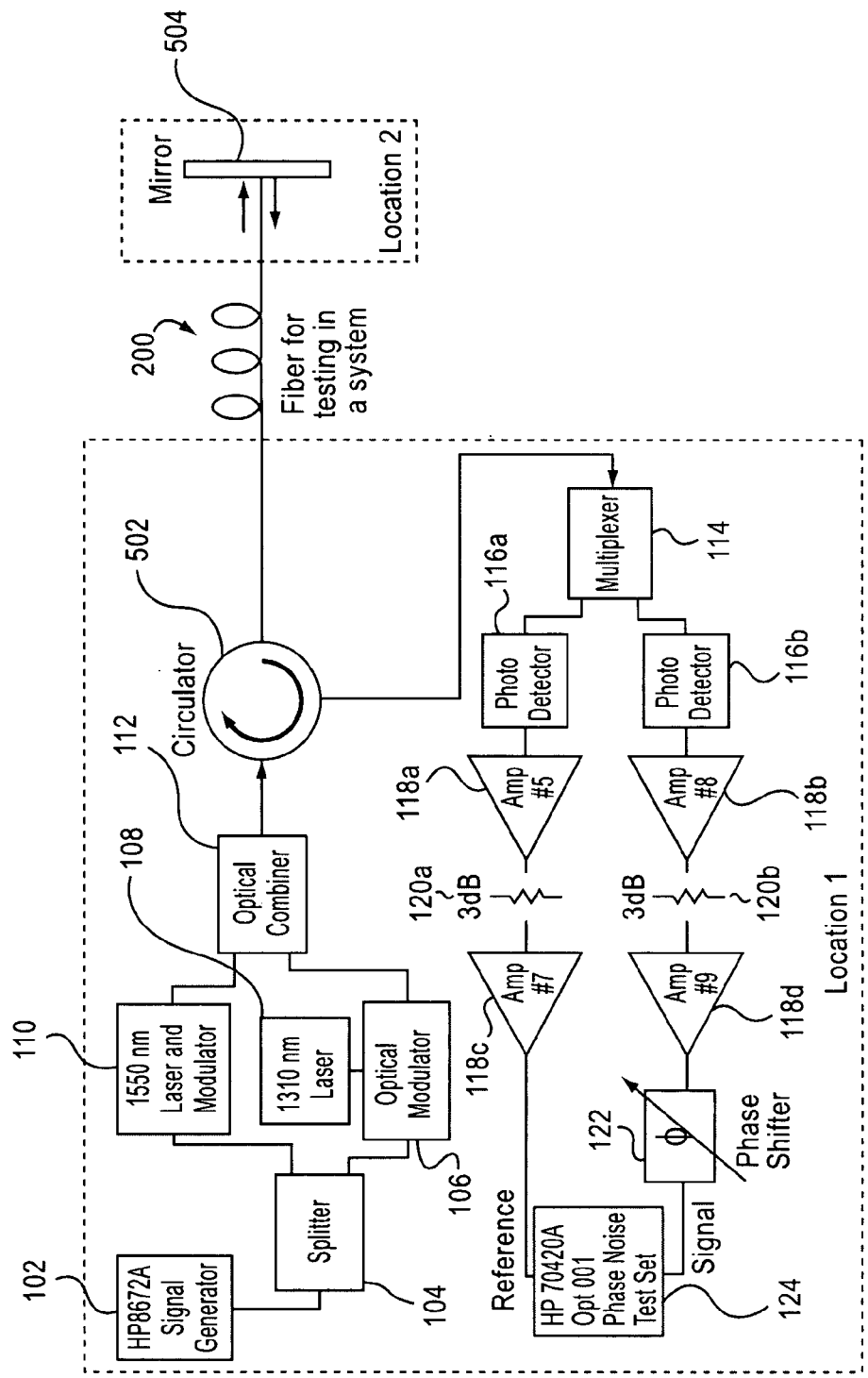
FIG. 5 is a block diagram of a system for testing long fiber between two locations, according to another embodiment of the present invention.

According to another embodiment of the invention, for systems that are already put in place, the following variant can be used. FIG. 5 shows a block diagram of a system for testing long fiber between two locations. In this embodiment, all the test equipment (components 102-124) comprising links 202 and 204 (other than the fiber length 200) are physically located at one location (Location 1). At Location 2, at the end of the fiber 200 under test, a mirror 504 is used to reflect the optical signals back into the fiber. At Location 1, a circulator 502 allows the generated signals to pass to the fiber under test and the reflected signal to go to the phase noise test set. The testing is performed as already described above.

Note that with this second approach, the measured noise will be greater (than testing at one location), because the measurement deals with two times the length of fiber in the system (i.e., a round trip in fiber 200). One skilled in the art will understand that this second embodiment requires some preliminary calibration measurements, which are necessary in order to compensate for the effect of doubling the fiber length for the particular fiber in the system.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

We claim:

1. A method for determining the phase noise of a fiber optic cable, comprising the steps of:
   a) transmitting a reference signal and a test signal over the fiber optic cable, said reference and test signal having different wavelengths; and
   b) measuring the phase noise of the fiber optic cable by comparing the reference signal and the test signal output from said fiber optic cable; wherein step a) includes steps of:
   generating an RF signal;
   splitting said RF signal into first and second RF signals, and modulating the first RF signal with a first optical carrier having a first wavelength and modulating the second RF signal with a second optical carrier having a second wavelength;
   combining said first and second modulating signals; and
   transmitting said combined signal over said fiber optic cable.

2. The method as recited in claim 1, wherein step b) includes steps of:
   splitting said received combined signal into the first and second RF signals;
   amplifying said first and second RF signals;
   shifting said second RF signal 90 degrees out of phase;
   comparing said first RF signal and the shifted second RF signal; and
   determining said phase noise based on the comparison.

3. The method as recited in claim 2, further comprising a step of:
   reflecting said combined signal transmitted over said fiber optic cable at a first end of the fiber optic cable; and
   circulating the reflected combined signal such that said step of splitting, splits the reflected combined signal; wherein
   said step of determining said phase noise accounts for a signal path of twice the length of said fiber optic cable.

4. The method as recited in claim 1, wherein said first and second wavelengths are separated by at least 1 nanometer.

5. The method as recited in claim 1, wherein said first and second wavelengths are separated by at least 100 nanometers.

6. The method as recited in claim 1, wherein said first wavelength is between 1300 and 1500 nm and said second wavelength is greater than 1500 nm.

7. The method as recited in claim 1, wherein said first wavelength is approximately 1310 nanometers and said second wavelength is approximately 1550 nanometers.

8. The method as recited in claim 1, wherein when the fiber optic cable to be tested exceeds approximately 100 meters in length, said first and second wavelength are selected to be within the 1550 band.

9. A system for measuring the phase noise of a fiber cable, comprising:
   means for transmitting a test signal and a reference signal via said fiber cable;
   means for receiving said test signal and said reference signal output from said fiber cable; and
   means for calculating a phase noise of said fiber cable from said test signal and said reference signal output from said fiber cable; wherein said means for transmitting includes:
   means for generating an RF signal;
   means for splitting said RF signal into first and second RF signals;
   means for modulating the first RF signal with a first optical carrier having a first wavelength and modulating the second RF signal with a second optical carrier having a second wavelength;
   means for combining said first and second modulating signals; and
   means for transmitting said combined signal over said fiber optic cable.

10. The system of claim 9, wherein said means for receiving includes:
    means for separating said received combined signal into the first and second RF signals;
    means for amplifying said first and second RF signals; and
    means for shifting said second RF signal 90 degrees out of phase; and wherein said means for calculating includes:
    means for comparing said first RF signal and the shifted second RF signal; and
    means for determining said phase noise based on the comparison.

11. The system as recited in claim 10, further comprising:
    a mirror positioned at a first end of said fiber optic cable to reflect signals transmitted in the fiber, and
    a circulator at a second of said fiber optic cable to direct a combined signal reflected from said mirror to said means for separating.

12. The system as recited in claim 9, wherein said first and second wavelengths are separated by at least 1 nanometer.

13. The system as recited in claim 9, wherein said first and second wavelengths are separated by at least 100 nanometers.

14. The system as recited in claim 9, wherein said first wavelength is between 1300 and 1500 nm and said second wavelength is greater than 1500 nm.

15. The system as recited in claim 9, wherein said first wavelength is approximately 1310 nanometers and said second wavelength is approximately 1550 nanometers.

16. The system as recited in claim 9, wherein when the fiber optic cable to be tested exceeds approximately 100 meters in length, said first and second wavelength are selected to be within the 1550 band.

* * * * *